T. E. C. Brinley.
Manufacture of Plow-Handles.
Nº 72596      Patented Dec. 24, 1867
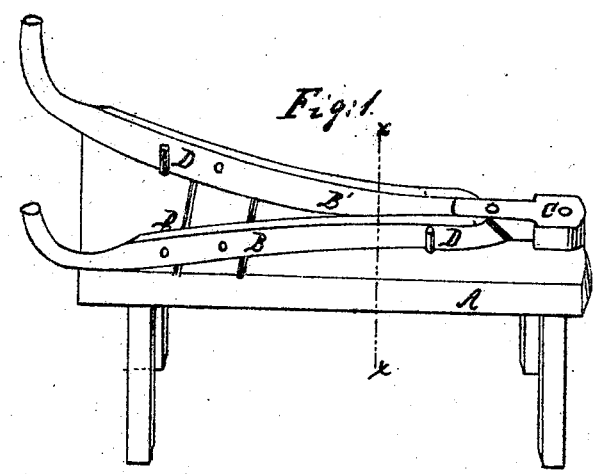
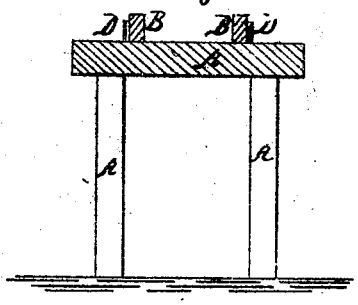
Witnesses.
Chas F. Clausen
L. Murphy
Inventor.
T. E. C. Brinley
by
D. P. Holloway & Co
his attys.

United States Patent Office.

T. E. C. BRINLY, OF LOUISVILLE, KENTUCKY.

Letters Patent No. 72,596, dated December 24, 1867.

---

IMPROVEMENT IN THE MANUFACTURE OF PLOUGH-HANDLES.

---

The Schedule referred to in these Letters Patent and making part of the same.

---

TO ALL WHOM IT MAY CONCERN:

Be it known that I, T. E. C. BRINLY, of Louisville, in the county of Jefferson, and State of Kentucky, have invented a new and useful Invention in the Manufacture of Plough-Handles; and I do hereby declare that the following is a full, clear, and exact description of the same, reference being had to the annexed drawings, making part of this specification, in which—

Figure 1 is a perspective view, and

Figure 2 is a transverse section, on the line $x\ x$, fig. 1.

The same letters are employed in both figures for the designation of parts which are identical.

My improvements relate to the mode of constructing plough-handles of irregular curvature, so that the holes for the braces may be bored in line before the handles are attached to the plough.

I have experienced great difficulty, in manufacturing ploughs, in putting up the handles so that the hole for the cross-braces should be in line, where the handles were of different lengths and of irregular curvatures. By the following mode of construction, I have been able to double the amount of work a workman could perform in a given time.

A is a bench, having holes through the top to receive pins for confining the handles in place. B B' represent the handles, which are of different lengths and of irregular curvature. C is a block, of the width of the plough-beam. The handles having been bent to the proper form, are placed on the bench, their ends being on each side of the block C. The handles being in the relative position as they are to be in the plough, are secured in place by pins D, and holes to receive the braces may now be bored in line with one another, and in the same parts of the handles, so that the completed handles will always have their holes in the same relative position. Thus any handle may be used in any plough of the designed size.

I do not claim for the form of the handles, nor any peculiar manner of bending them, but—

What I do claim as my invention, and desire to secure by Letters Patent, is—

The mode of manufacturing the handles of ploughs, of different lengths and irregular curvature, by the use of a table, A, gauge-block C, and pins D, so as to secure the proper alignment of the brace-holes, substantially as set forth.

In testimony whereof, I have signed my name to this specification in the presence of two subscribing witnesses.

T. E. C. BRINLY.

Witnesses:
JOHN H. BATES,
T. W. CONNELLY.